(12) United States Patent
Ikeda et al.

(10) Patent No.: US 11,014,065 B2
(45) Date of Patent: May 25, 2021

(54) HYDROPHILIZED MATERIAL, HYDROPHILIZED MEMBER, AND GAS-LIQUID CONTACT APPARATUS IN WHICH SAME IS USED

(71) Applicant: IHI Corporation, Koto-ku (JP)

(72) Inventors: Ryosuke Ikeda, Tokyo (JP); Yoshiyuki Iso, Tokyo (JP); Shiko Nakamura, Tokyo (JP); Hirohito Okuhara, Tokyo (JP); Kenji Takano, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/668,001

(22) Filed: Oct. 30, 2019

(65) Prior Publication Data

US 2020/0061574 A1    Feb. 27, 2020

Related U.S. Application Data

(63) Continuation of application No. PCT/JP2018/027328, filed on Jul. 20, 2018.

(30) Foreign Application Priority Data

Jul. 25, 2017    (JP) .............................. JP2017-143328

(51) Int. Cl.
*B01F 3/04*    (2006.01)
*B01J 19/32*    (2006.01)
(Continued)

(52) U.S. Cl.
CPC .......... *B01J 19/32* (2013.01); *B01D 53/1475* (2013.01); *B01D 53/18* (2013.01); *B01D 53/62* (2013.01);
(Continued)

(58) Field of Classification Search
CPC ........ B01D 53/18; B01F 3/04; B01F 3/04021; B01F 3/04078
See application file for complete search history.

(56) References Cited

U.S. PATENT DOCUMENTS 4,055,378 A * 10/1977 Feneberg ......... B29D 11/00038
351/159.33
8,646,758 B2 * 2/2014 Raynal ..................... B01J 19/32
261/112.2
(Continued)

FOREIGN PATENT DOCUMENTS

JP           3575071 B2    10/2004
JP      2006-291884 A     10/2006
(Continued)

OTHER PUBLICATIONS

International Search Report dated Oct. 16, 2018 in PCT/JP2018/027328 filed on Jul. 20, 2018.
(Continued)

*Primary Examiner* — Robert A Hopkins
(74) *Attorney, Agent, or Firm* — Oblon, McClelland, Maier & Neustadt, L.L.P.

(57) ABSTRACT

A hydrophilized material has a surface provided with surface roughness that arithmetic mean roughness is 0.3 µm to 1.0 µm and mean width of roughness profile elements is 0.1 mm or less. A hydrophilized member that contacts a liquid is at least partially made of the hydrophilized material. The hydrophilized member is applicable to a gas-liquid contact apparatus having a gas-liquid contact section, a liquid supply system, and a gas supply system, to constitute the gas-liquid contact section as a packing element. Wettability imparted due to the surface roughness is exhibited continuously.

14 Claims, 4 Drawing Sheets

(51) Int. Cl.
*B01D 53/14* (2006.01)
*B01D 53/18* (2006.01)
*B01D 53/62* (2006.01)
*B01D 53/78* (2006.01)

(52) U.S. Cl.
CPC ............... *B01D 53/78* (2013.01); *B01F 3/04* (2013.01); *B01F 3/04078* (2013.01); *B01D 2252/2026* (2013.01); *B01D 2252/20484* (2013.01)

(56) References Cited

U.S. PATENT DOCUMENTS

| | | |
|---|---|---|
| 8,784,981 B2 | 7/2014 | Chang et al. |
| 2010/0034335 A1 | 2/2010 | Varanasi et al. |
| 2012/0237755 A1 | 9/2012 | Chang et al. |
| 2013/0127075 A1 | 5/2013 | Tsujiuchi et al. |
| 2013/0171547 A1 | 7/2013 | Tanno |
| 2016/0249541 A1 | 9/2016 | Nishimura et al. |

FOREIGN PATENT DOCUMENTS

| | | |
|---|---|---|
| JP | 2008-164279 A | 7/2008 |
| JP | 2009-297691 A | 12/2009 |
| JP | 4413416 B2 | 2/2010 |
| JP | 2011-051101 A | 3/2011 |
| JP | 2013-146711 A | 8/2013 |
| JP | 2015-096060 A | 5/2015 |
| JP | 5794775 B2 | 10/2015 |
| WO | WO 2012/032922 A1 | 3/2012 |

OTHER PUBLICATIONS

Written Opinion dated Oct. 16, 2018 in PCT/JP2018/027328 filed on Jul. 20, 2018.
Kim, B. S., et al., "Surface roughening for hemi-wicking and its impact on convective boiling heat transfer", International Journal of Heat and Mass Transfer, 102 (2016), pp. 1100-1107.
Australian Office Action dated Oct. 5, 2020 in Patent Application No. 2018307001, citing documents AA therein, 5 pages.

* cited by examiner

HYDROPHILIZED MATERIAL, HYDROPHILIZED MEMBER, AND GAS-LIQUID CONTACT APPARATUS IN WHICH SAME IS USED

CROSS REFERENCE TO RELATED APPLICATIONS

This application is a continuation application of International Application No. PCT/JP2018/027328, filed on Jul. 20, 2018, which claims priority of Japanese Patent Application No. 2017-143328, filed on Jul. 25, 2017, the entire contents of which are incorporated by reference herein.

BACKGROUND

Technical Field

The present disclosure relates to a hydrophilized material useful for mass transfer between gas and liquid in gas-liquid contact, a hydrophilized member provided by using it, and a gas-liquid contact apparatus that performs mass transfer or heat transfer such as separation, purification, heat exchange, etc. by using gas-liquid contact.

Description of the Related Art

In chemical plants, thermal power plants, and the like, exhaust gas and mixed gas containing various components, such as acid gas and hazardous gas, are discharged. In order to process such gas, a gas separation apparatus that separates, removes, or recovers a specific component from gas has been used conventionally, whereby purification of exhaust gas or mixed gas and separation and recovery of carbon dioxide etc., has been performed. For example, in a carbon dioxide recovery apparatus, carbon dioxide is absorbed and separated by contacting gas containing carbon dioxide with an absorption liquid such as a monoethanolamine aqueous solution, and carbon dioxide is released in a gas phase for recovery by subjecting the absorption liquid, which has absorbed, to gas-liquid contact while heating the absorption liquid. Also in a gas purifier for removing a hazardous gas component from exhaust gas, and a gas separation apparatus for separating a specific gas component from mixed gas, a specific gas component is absorbed by an absorption liquid with the use of gas-liquid contact.

In general, an apparatus for performing gas-liquid contact has a packing for increasing a contact area between a liquid and a gas, which brings the liquid and the gas into gas-liquid contact on the surface of the packing, whereby a specific gas component or heat in the gas is transferred to the liquid. In order to secure the gas-liquid contact area in such processing, a packing having good surface wettability to the liquid is required, so there is proposal of the packing with various improvements.

In Japanese Patent No.5794775 (Publication Document 1 below), it is described that a gas purifier is configured by using, as a gas-liquid contact plate, a substrate whose surface is subjected to a hydrophilization treatment and which has both a liquid dispersion structure including multiple steps of hole groups and a convex liquid receiving structure. Examples of the hydrophilization treatment of the substrate include physical treatments, such as blasting, and chemical treatments, such as a plasma treatment.

On the other hand, in Japanese Patent No.4413416 (Publication Document 2 below), a wetted wall for a gas absorption apparatus is described, and electrolysis pits are formed at high density on the surface of the wetted wall. It is described that, because the electrolysis pit is a fine pit having a unique shape, the electrolysis pit holds an alkanolamine aqueous solution adhering to its surface.

DOCUMENTS LIST

Publication Document 1: Japanese Patent No. 5794775
Publication Document 2: Japanese Patent No. 4413416

BRIEF SUMMARY

As described above, surface roughening by a physical treatment or a chemical treatment is used as a method of improving the wettability of the surface of a material. In chemical treatments such as a UV treatment and a plasma treatment, it is considered that formation of an oxygen-rich functional group or a hydrophilic functional group, due to activation of a surface, and removal of organic substance contamination are elements to improve wettability. However, the wettability improved by the chemical treatment has low persistence, so it is a practical problem that it is necessary to repeat the surface treatment to maintain the wettability.

On the other hand, it is considered that in roughening by physical treatments such as blasting and dull roll processing, an increase in surface area is an element to improve wettability. Improvement of wettability in the physical treatment is persistent and it does not decline in a short time. However, the degree of improvement in wettability is not as remarkable as in the case of the chemical treatment, and it is said that, in order to acquire satisfactory wettability, an increase of several percent to several tens percent in surface area is required, but such roughening is difficult. This is also described in the above Patent Literature 2.

However, the fact that a wettability improvement effect of roughening by a physical treatment is persistent is an advantage regrettable to throw away. In particular, in the field of gas separation apparatuses etc., using a large number of packing, necessity of reprocessing and replacing the packing decreases by the persistence of wettability. Therefore, if it is possible to obtain satisfactory wettability by roughening by a physical treatment, it will be a practically very advantageous technology, and a technological improvement is thus expected.

The present disclosure has been made in view of the above-described problems, and an object of the disclosure is to provide a hydrophilized material and a hydrophilized member, which have a good improvement in wettability associated with roughening by a physical treatment and are capable of realizing efficient gas-liquid contact, and a gas-liquid contact apparatus using them.

In order to solve the problem, a hydrophilized material according to one aspect of the present disclosure can be summarized to have a surface provided with surface roughness in which arithmetic mean roughness is 0.3 µm or more and 1.0 µm or less and a mean width of roughness profile elements is 0.1 mm or less.

It is preferable that, in the surface, the arithmetic mean roughness be 0.3 to 0.8 µm and the mean width of roughness profile elements is 0.02 to 0.1 mm. The hydrophilic material may be composed of a metal or a plastic, wherein the metal includes a simple metal or an alloy, made of at least one metal element selected from iron, copper, nickel, titanium, zirconium, and aluminum, and the plastic includes at least one plastic selected from acrylic polymer, polyimide, polyolefin, epoxy resin, phenolic resin, polyvinyl chloride, and fluororesin.

According to one aspect of the present disclosure, a hydrophilized member can be summarized that at least a part thereof is made of the hydrophilic material and it contacts a liquid.

The hydrophilized member may be configured as a nozzle having a discharge port for discharging a liquid, wherein the discharge port has a surface provided with the surface roughness. Alternatively, the hydrophilized member may be made of the hydrophilic material, and may be in use as a packing element for using mass transfer or heat transfer associated with gas-liquid contact.

Further, according to one aspect of the present disclosure, a gas-liquid contact apparatus can be summarized to comprise: a gas-liquid contact section that has a plurality of packing elements made of the hydrophilized material; a liquid supply system that supplies a liquid to the gas-liquid contact section and causes the liquid to flow down along surfaces of the plurality of packing elements; and a gas supply system that supplies a gas to the gas-liquid contact section so as to contact the liquid flowing down along the surfaces of the plurality of packing elements.

In the gas-liquid contact apparatus, the liquid supply system can be configured to supply, as the liquid, an absorption liquid that can absorb a component contained in the gas, whereby the gas-liquid contact apparatus functions as a gas separation apparatus with the component contained in the gas transferred to the absorption liquid through gas-liquid contact in the gas-liquid contact section. When the absorption liquid is an aqueous liquid containing an amine compound and the component of the gas to be transferred to the absorption liquid is carbon dioxide, the gas-liquid contact apparatus functions as a gas separation apparatus that separates and recovers the carbon dioxide. The plurality of packing elements have a flat plate shape, and when they are arranged upright in parallel to each other, flow resistance in the gas-liquid contact apparatus becomes small.

According to the present disclosure, it is possible to provide a hydrophilized material and a hydrophilized member, imparted with satisfactory wettability associated with roughening by a physical treatment and exerting the wettability persistently. With a gas separation apparatus using them, it is possible to perform good gas-liquid contact for a long period, whereby necessity of replacement and maintenance of the apparatus and parts used in gas-liquid contact processing decreases.

DETAILED DESCRIPTION OF EMBODIMENTS

Figure 1:
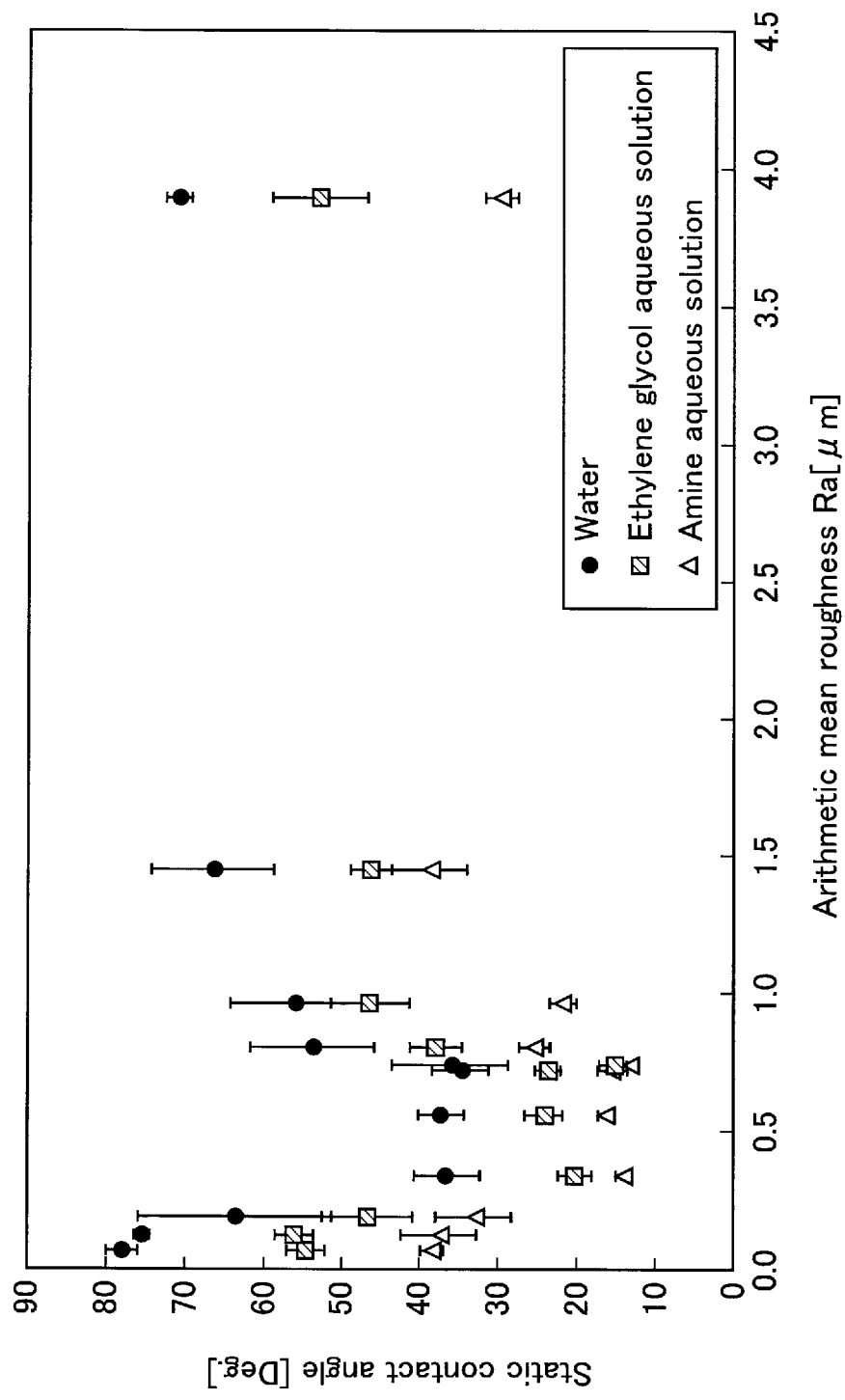
FIG. 1 is a graph illustrating the relationship between the arithmetic mean roughness (Ra) and the contact angle, for evaluating the surface roughness of material.

Hereinafter, description for embodiments of the present disclosure will follow in detail with reference to the drawings. Note that dimensions, materials, concrete numerical values and the like indicated in the embodiments are described for facilitating understanding of the contents, so they are not intended to limit the present disclosure, unless specifically stated otherwise. In the present description and drawings, elements having substantially the same function and configuration are shown with denoted by identical reference numerals and redundant description will be omitted. Illustration of elements not directly related to the present disclosure will be omitted.

Roughing of the material surface is a technology that is usable for improving the wettability of the material surface, improving the adhesiveness of an adhesive etc., or the like. Examples of physical processing used as the roughening treatment includes polishing, shot-blasting, dull roll processing, etching, and the like. In order to specify the conditions that can enhance the improvement of wettability by the roughening treatment, research has been conducted with adopting various processing conditions. However, to the extent known so far, it is not easy to acquire satisfactory wettability by roughening, and it often leads to a complex and complicated configuration, such as providing unevenness and grooves of special shapes.

However, with the improvement of surface measurement technology, it has become possible to investigate more precisely the surface condition of materials. Thus, when examining again the effect of the roughening treatment by using such a surface measurement technology, it has been found that the wettability is remarkably improved in a range where specific roughness conditions are satisfied. The roughness conditions where the wettability is remarkably improved fall within a range of roughness that is considerably smaller than the range of surface roughness that has been conventionally studied as a hydrophilization treatment, and it is a range recognized as appearance processing such as matting or smoothing, rather than roughening.

Specifically, when a material subjected to the roughening treatment has a surface in which fine unevenness are formed such as to have the arithmetic mean roughness (Ra) of 0.3 μm to 1.0 μm and the mean width of roughness profile elements (Rsm) of 0.1 mm or less, the material exhibits remarkably improved wettability. Therefore, an excellent hydrophilic material can be obtained by specific roughening. This is a property that appears in common if the conditions of surface roughness are satisfied, regardless of the type of physical treatment to be roughened. That is, hydrophilicity is imparted in accordance with surface roughness in the roughening by any of the above-described processes or treatments.

The arithmetic mean roughness (Ra) represents the fluctuation in the height direction of surface irregularities, and the mean width of roughness profile elements (Rsm) represents the lateral length or width of the concave portion or convex portion. Therefore, the surface roughness specified above can be regarded as an uneven state in which there are concave portions having a width of approximately 0.1 mm or less and a depth of approximately 0.3 μm or more, and it is very fine unevenness.

The wettability of the material can be evaluated by the contact angle of a droplet on the surface of the material, and the wettability is evaluated to be high as the contact angle is small. FIG. 1 is a graph in which the relationship between the surface roughness and the wettability has been examined by measuring the contact angle (static contact angle) on the surface in the materials subjected to roughening treatments. The graph shows the change in the contact angle according to the arithmetic mean roughness (Ra), in the cases where each liquid of water, an ethylene glycol aqueous solution, and an amine aqueous solution is used. In the graph of FIG. 1, it is obvious that the contact angle is remarkably reduced in the range where the arithmetic mean roughness (Ra) is 1.0 μm or less, and that the wettability is significantly improved at an arithmetic mean roughness of approximately 0.3 to 1.0 μm. Then the wettability is particularly excellent at an arithmetic mean roughness of approximately 0.3 to 0.8 μm. Since this tendency is observed in any of the three types of liquids, it can be regarded as being not caused by a hydrophilic group or the like but by a physical surface shape.

Figure 2:
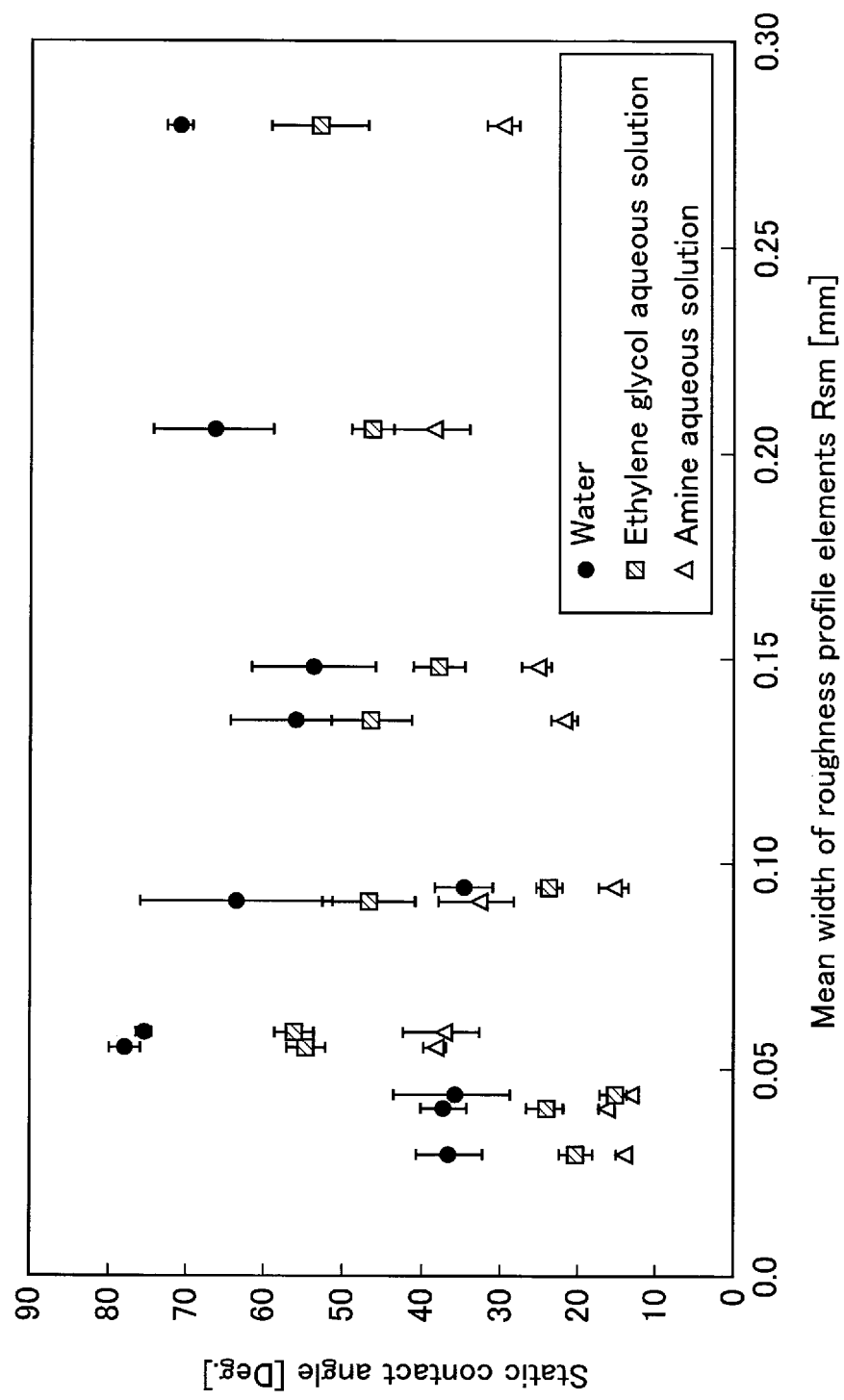
FIG. 2 is a graph illustrating the relationship between the mean width of roughness profile elements (Rsm) and the contact angle, for evaluating the surface roughness of material.

When the measurement data of the contact angle in the materials for which the graph of FIG. 1 has been created are graphed as a function of the mean width of roughness profile elements (Rsm), a graph as shown in FIG. 2 can be obtained. In FIG. 2, those having a small contact angle (high wettability) are present in the range where the mean width (Rsm) is approximately 0.10 mm or less, while there is seen a large variation in the contact angle data in this range. From this, it is considered that the mean width (Rsm) being approximately 0.10 mm or less is a necessary condition for improving wettability, but is not a sufficient one.

Figure 3:
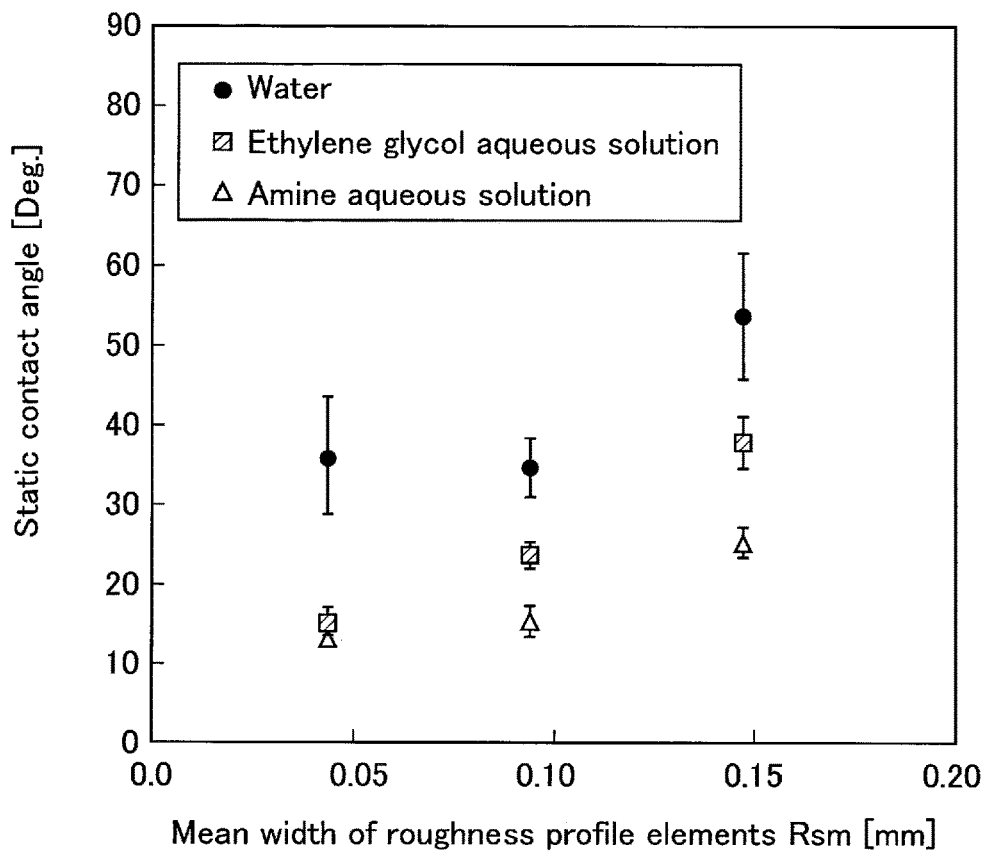
FIG. 3 is a graph illustrating the relationship between the mean width of roughness profile elements (Rsm) and the contact angle, in materials whose arithmetic mean roughness (Ra) are comparable.

When studying the materials which exhibit a large value of contact angle in the range where the mean width (Rsm) is approximately 0.10 mm or less, it is hound that these are a material having a value of the arithmetic mean roughness (Ra) of more than 1.0 μm or a material (Ra: 0.069 μm) not subjected to a roughening treatment. Therefore, with respect to the materials selected for having close values of the arithmetic mean roughness (Ra) (Ra: approximately 0.7 μm), the relationship between the contact angle and the mean width (Rsm) is graphed, which results in obtaining a graph as shown in FIG. 3. According to this graph, it is apparent that the contact angle decreases as the mean width (Rsm) decreases. That is, if the value of the arithmetic mean roughness (Ra) is within a predetermined range, good wettability is exhibited when the mean width (Rsm) is in the range of approximately 0.10 mm or less. When evaluating the graph of FIG. 2 based on this point, the materials having the mean width (Rsm) in the range of approximately 0.02 to 0.10 mm show excellent wettability.

Since the good wettability by the roughening as describe above is exhibited due to very fine unevenness, it is considered that the improvement effect in wettability is due to an action like capillary force. That is, the effect of retaining the liquid is exerted by forming a narrow (thin) concave portion that allows capillary force to act, at a depth greater than or equal to a predetermined value, whereby wettability is improved. Therefore, the range of the unevenness in which the capillary force can act is defined by the mean width (Rsm) of 0.10 mm or less, and the range of the unevenness where the effect of capillary force becomes significant is defined by the arithmetic mean roughness (Ra) of 0.3 μm or more. In this regard, the improvement in wettability cannot be obtained in the range where the arithmetic mean roughness (Ra) exceeds 1.0 μm, which is considered to be due to the characteristic of the roughening by a physical method. In other words, it is considered because the lateral width of unevenness is inevitably increased when unevenness having a large arithmetic mean roughness (Ra) is formed by a physical method, so that it is difficult to perform roughening in which the arithmetic mean roughness (Ra) becomes large and the mean width (Rsm) becomes small.

Examples of the physical treatment capable of roughening the material to have the surface roughness as described above include polishing, shot blasting, dull roll processing, etching, and the like, and any kind of the physical treatments may be used. Since the surface roughness given by the surface roughening treatment varies depending on the quality of material, it is appropriate to adjust the treatment conditions so that the fine irregularities as described above can be formed, by selecting the abrasive to be used and setting the surface roughness of the rolling roll, depending on the material quality.

The shot blasting is a roughening method of forming unevenness by spraying abrasives onto the surface. The abrasives are commercially available in various shapes and dimensions, such as a granular shape and a deformed granular shape having a sharp corner (grit), which are formed by using various materials such as metal, ceramics, glass, mineral matter, and plastics. Examples of the abrasives include silica sand, silica stone grain, cast iron grain, brown alumina, white alumina, glass beads, steel balls, and the like. Since the hardness varies depending on the material of the abrasive, it is possible to appropriately select and use an abrasive by which the material can be processed to have the above surface roughness, and its size and shape, depending on the quality of the material to be subjected to the roughening treatment.

Polishing is a roughening method in which a material surface is rubbed with a paste or a polishing sheet, etc. prepared by using abrasive grains (fine abrasives) of several pm to several mm. Examples of the material quality of the abrasive include natural minerals and artificial minerals such as artificial diamond, cubic boron nitride, silicon carbide, corundum (aluminum oxide) and the like. The polishing is performed by selecting the abrasive material according to the quality of material to be subjected to the roughening treatment, so that it can be processed and used to have the surface roughness as described above. When the material to be subjected to the roughening is steel or copper, diamond and silicon carbide are not suitable as abrasives and abrasives free of carbon and silicon are suitable.

Dull roll processing is a process in which the surface of a material is roughened by rolling the material using a rolling roll (dull roll) whose surface has been roughened. Electrical discharge machining, laser processing, electrolytic treatment, and the like are usable for roughening the surface of the rolling roll. Although the roughening can also be performed easily by the above shot blasting, electrical discharge machining, laser processing and the like are easy to use in terms of variations in surface roughness and the size of the processing range, etc. Depending on the surface roughness of the dull roll and the rolling conditions, unevenness is formed on the surface of the material subjected to rolling. Therefore, by preparing a dull roll having a surface that has been subjected to proper roughening corresponding to the above-described surface roughness, and by rolling the material under appropriate rolling conditions, the surface roughness as described above is formed on the surface of the material. Thus, a hydrophilized material whose wettability is preferably improved can be obtained.

The improvement of wettability by the roughening treatment as described above is possible for a material whose surface can be roughened, that is, a material having plasticity. In other words, it can be applied to various metal materials and various plastic materials, so that various hydrophilized materials can be provided by using metal or plastic materials. Examples of the metal material include simple metal materials composed of a metal element, such as iron, copper, nickel, titanium, zirconium, and aluminum, and alloy materials composed of a binary alloy or a multi-element alloy containing at least one metal element selected from the above metal elements. By subjecting the metal material to the surface roughening treatment, it is possible to provide a metal-made hydrophilized material having good wettability. Examples of the plastic material include acrylic polymer, polyimide, polyolefin, epoxy resin, phenolic resin, polyvinyl chloride, fluororesin, and the like. Appropriately selecting from such plastics materials, it is possible to provide a hydrophilized plastic material. Regarding the utilization, one of various types of hydrophilized materials as described above may be used alone, or two or more types of hydrophilized materials may be used in combination. It is also possible to combine a metal-made hydrophilized material and a plastic-made hydrophilized material. By using such a hydrophilized material as a structural material or the like, it is possible to configure a hydrophilized member and various apparatuses. Materials mainly made of steel such as stainless steel and plated steel, etc., are materials that are widely used in the manufacture of equipment, instruments, parts, etc., and hydrophilized materials obtained by subjecting these materials to the surface roughening treatment as described above are useful in the manufacture of devices, instruments and the like that require wettability.

The material imparted with a suitable surface roughness by the roughening treatment as describe above is remarkably improved in wettability and is made hydrophilic, so that it can be used as a member that is required to be in good contact with a liquid. For example, a hydrophilized member with substantially whole surface subjected to the roughening treatment can be provided as a packing element of a gas-liquid contact apparatus for utilizing mass transfer or heat transfer associated with gas-liquid contact. Then it is possibly used in gas separation apparatuses such as an absorption towers and desulfurization towers; purification equipment such as distillation towers; and heat exchange equipment such as cooling towers and boilers. Further, if applying it to the combustion chamber wall of a satellite thruster, it is possible to enhance the effect of preventing the wall surface from overheating by the formation of a fuel liquid film. It is also possible to provide as a hydrophilized material in which at least a part of the surface has been subjected to the roughening treatment depending on the application. For example, a material to be used as a printing material, a building material such as wall materials, a structural material for manufacturing apparatuses or instruments, or the like, is coated with a paint or a molten metal when it is used. Therefore, if the above-mentioned roughening is applied to the surface of the material that becomes a painted surface, a printed surface, a soldered surface, a welded surface, etc., to impart a suitable surface roughness to the material, it can be provided as a hydrophilized material specialized for such applications.

Further, as for members and instruments in contact with a liquid, they may be provided as a hydrophilized member constructed with a hydrophilized material such that a part or the whole of the surface in contact with the liquid has a suitable surface roughness. Examples of the hydrophilic member include a nozzle, etc. constructed with a hydrophilic material so that the surface of the discharge port at the tip for discharging the liquid has a suitable surface roughness. Thereby the adverse effect due to inhibition of liquid wetting is suppressed at the discharge port, and the discharge accuracy when supplying the liquid can be improved. In such a nozzle, only the tip portion having the discharge port may be made of a hydrophilized material, or the whole of the nozzle may be composed of a hydrophilized material partially subjected to the roughening processing so that the surface of the discharge port has a suitable surface roughness. Such a hydrophilized member may be obtained by manufacturing a member composed of a material that has not be roughened and then by applying the roughening treatment to a desired surface to give the surface roughness as described above. As described above, the hydrophilized material that exhibits good wettability with a suitable surface roughness is applicable to various uses utilizing liquid film formation.

The hydrophilized material to which the surface roughness as described above has been imparted is useful as a packing element that constitutes a gas-liquid contact section that brings a gas and a liquid into contact with each other in a gas-liquid contact apparatus. In particular, a packing in which a plurality of flat plate-shaped packing elements are arranged upright in parallel to each other has a small gas flow resistance in a state of being loaded in the gas-liquid contact apparatus. Therefore, the hydrophilized material mentioned above is highly useful as a material to be applied to such a packing. By application of the above-mentioned hydrophilized material, a gas-liquid contact apparatus having both good wettability and low flow resistance of the packing elements can be provided, whereby high treatment efficiency and reduction in operating costs can be realized.

Figure 4:
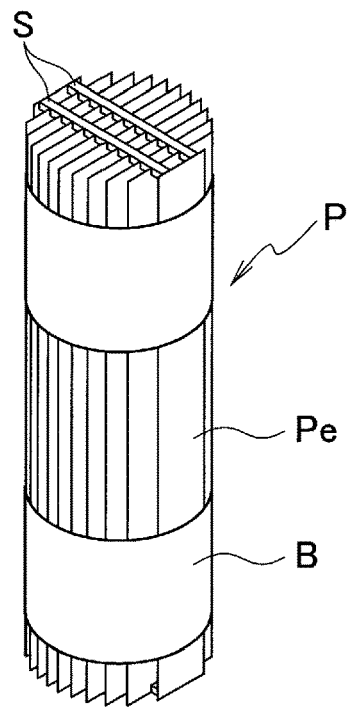
FIG. 4 is a schematic view illustrating one embodiment of a packing configured by packing elements using the hydrophilized material.

FIG. 4 illustrates an example of a packing having a plurality of flat plate-shaped packing elements arranged upright in parallel to each other. In this example, a cylindrical packing P is configured by arranging flat plate-shaped packing elements Pe having the same length and different widths, in parallel to each other at equal intervals. In the packing P formed of such flat plate packing elements Pe, the gas flows through the straight spaces between the packing elements Pe, so that the flow resistance when supplying the gas is small. The flow resistance of the gas when contacting the gas and the liquid affects the energy consumption during operation. Therefore, in order to perform an efficient gas treatment while reducing the operation cost, it is effective to apply, to such a packing P, a plate of the hydrophilized material to which the above-described surface roughness has been provided. From the viewpoint of corrosion resistance etc., a packing element made of stainless steel is preferably used.

Since the shapes of the packing elements Pe are rectangles respectively corresponding to cross sections parallel to each other that are formed by cutting a circular cylinder at equal intervals along its axis direction, the widths of the packing elements Pe to be used are different from each other. The distance between the packing elements Pe is maintained by a spacer S, and the entire shape is fixed to a cylindrical shape by a band B which surrounds the packing elements Pe arranged parallel to each other to fasten them. Instead of using the spacer S, the interval between the packing elements Pe arranged parallel to each other may be maintained by another method such as providing a protrusion on the surfaces of the packing elements Pe, or attaching a small rib to the packing elements Pe. It is easy to understand that, using the rectangular packing elements Pe, the packing P can be configured in various columnar shapes including polygonal columns such as a square column, elliptical columns, and the like, and it is not limited to the packing of cylindrical shape.

Figure 5:
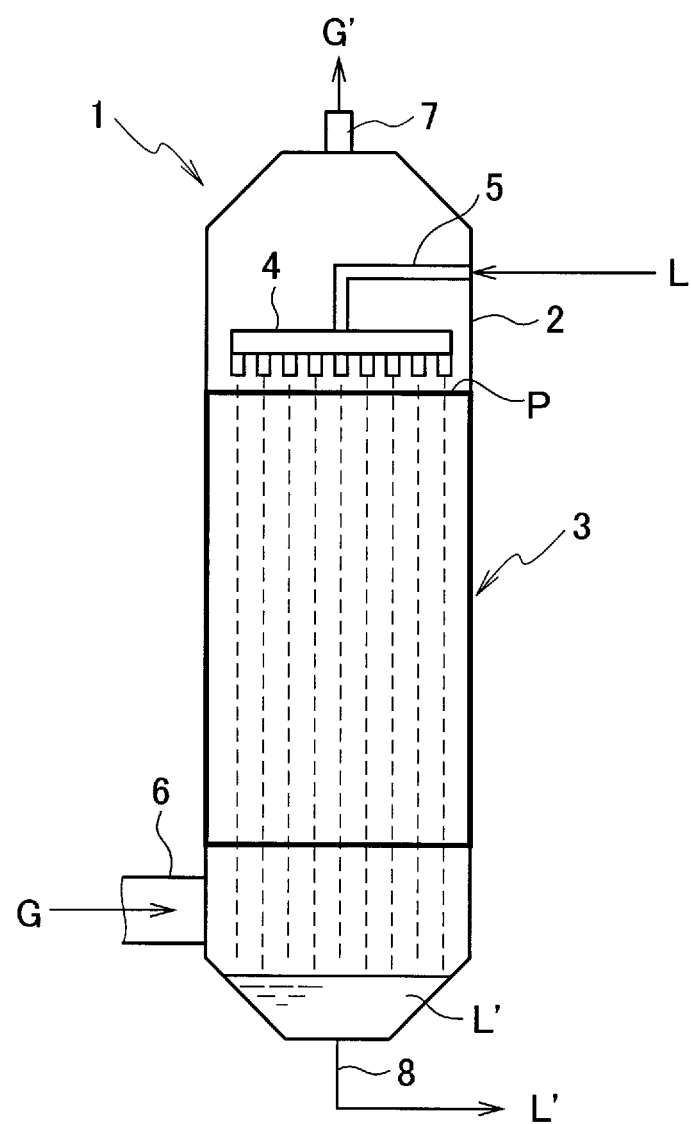
FIG. 5 is a schematic configuration view illustrating one embodiment of a gas-liquid contact apparatus using the packing illustrated in FIG. 4.

FIG. 5 shows an embodiment of a gas-liquid contact apparatus in which the packing P formed by a plurality of the packing elements as shown in FIG. 4 is used as a packing for gas-liquid contact. The gas-liquid contact apparatus 1 includes a gas-liquid contact section that has packing elements, a liquid supply system that supplies a liquid to the gas-liquid contact section, and a gas supply system that supplies a gas to the gas-liquid contact section. As shown in FIG. 5, a gas-liquid contact section 3 is formed in a container 2 of the gas-liquid contact apparatus 1 by loading the packing P into the container 2. The liquid supply system includes a spray pipe 4 arranged above the packing P, and a liquid supply line 5 connected to the spray pipe 4. A liquid L, which is supplied to the spray pipe 4 in the gas-liquid contact apparatus 1 through the liquid supply line 5, is sprayed from the spray pipe 4 onto the packing P. On the other hand, as the gas supply system, a gas supply line 6 is provided to be connected to the lower portion of the container 2, and the gas G supplied to the gas-liquid contact apparatus 1 through the gas supply line 6 ascends the gas-liquid contact section 3. The liquid L flows down along the surfaces of the packing elements of the packing P, whereby the liquid L flowing down and the rising gas G contact each other.

This gas-liquid contact apparatus 1 is configured as a gas separation apparatus that separates a component contained in a gas by transferring it to an absorption liquid, and an absorption liquid that can absorb the component contained in the gas G is supplied as the liquid L. Therefore, the liquid L, which forms a liquid film on the packing P, absorbs a specific component in the gas G during the gas-liquid contact in the gas-liquid contact section 3. Gas G' from which the specific component has been separated and removed by the liquid L is discharged outside through a gas discharge line 7 connected to the top of the container 2, which is discharged in the air or, if necessary, transported to another processing equipment. A liquid L', which has functioned as an absorption liquid, is stored in the bottom of the container 2, and is then discharged outside through a drainage line 8 connected to the bottom. The discharged liquid L' is purified (regenerated) within the equipment in a chemical plant, a thermal power plant, or the like, and, after stored in a storage tank as needed, the liquid can be supplied to the liquid supply line 5. Alternatively, it may be configured in such a manner that, by attaching a regeneration apparatus for the liquid L, the liquid circulates between the gas-liquid contact apparatus 1 and the regeneration apparatus. When an aqueous liquid containing an amine compound is used as the absorption liquid, carbon dioxide contained in the gas is transferred to the absorption liquid, whereby this apparatus can be used as a gas separation apparatus that absorbs and separates carbon dioxide in gas.

Since the packing P having a structure as described above is used in a state where the flat plate-shaped packing elements are arranged upright in the gas-liquid contact apparatus 1, the flow path of the gas G has a straight and simple shape between the packing elements arranged in parallel to each other at equal intervals. The flow resistance is therefore small. The cost required for performing the roughening treatment in the hydrophilized material used as the packing element is also small, and it is therefore possible to reduce the manufacturing processing cost as well.

In the gas-liquid contact apparatus 1, the container 2 only needs to have a hollow shape having a filling space inside, and one having an approximately cylindrical container is used in general. The spray pipe 4 is formed of a plurality of pipes arranged in a parallel pattern or lattice pattern, above the packing P. In FIG. 5, straw nozzles for emitting the liquid L are provided in a lower portion of each pipe of the spray pipe 4. However, the spray pipe 4 is not limited to such a structure, but may be composed of a tube having no nozzle and having emission ports formed. Therefore, commonly used spraying tools such as a shower head and a spray nozzle can be appropriately used. In FIG. 5, it is configured that the gas G is supplied from the lower portion of the container 2 to be raised, but it may be modified so that the gas is supplied from the upper portion to flow down. If necessary, a cooling apparatus for cooling the gas G in advance, a drain recovery apparatus for discharging drain, and the like may be attached to the gas-liquid contact apparatus 1.

Examples of the gas G to be processed by the gas-liquid contact apparatus 1 include waste gas (exhaust gas) and reaction gas generated in facilities such as a chemical plant, a thermal power plant, and the like. Acid gases such as carbon dioxide, nitrogen oxides, and sulfur oxides are often treated as specific components. Depending on the specific component to be removed from the gas G, the liquid L used as the absorption liquid is selected. For example, an aqueous solution of an alkaline agents such as cyclic amine compounds, alkanol amines, phenolic amines, and alkali metal salts is often used for recovery and removal of carbon dioxide, and an aqueous solution of an alkaline agent such as calcium compounds and magnesium compounds is generally used for removing sulfur oxides. In an aqueous solution of monoethanolamine (MEA) often used in the recovery of carbon dioxide, carbamate.amine salt (carbamate), carbonate, bicarbonate and the like are generated by reaction with carbon dioxide.

Because of the above, each part which constitutes the gas-liquid contact apparatus 1 is manufactured of a material resistant to the component of the gas G and the chemical agent contained in the liquid L that are described above. Therefore, the packing P and the packing element Pe are made of a material that does not cause reaction (corrosion) with the gas G to be processed and the liquid L to be used. Examples of such a material include metals such as stainless steel, aluminum, nickel, titanium, carbon steel, brass, copper, monel, silver, tin and niobium, and resins such as polyethylene, polypropylene and PTFE.

For the packing element Pe used is a hydrophilized material having the surface roughness described above, that is obtained by using a layered material at least whose surface is made of a corrosion-resistant material as described above and by surface processing to form fine irregularities on the surface. Surface processing such as sanding, sand blasting, dull roll processing and the like is usable. The packing element Pe is suitably used in the form of a flat plate having a uniform thickness, a plate material having openings, or a mesh-like sheet.

The packing P is not limited to the application to the gas-liquid contact apparatus for absorbing/separating/removing the specific component as described above, but it can also be applied to other apparatuses used in various chemical plants, such as distillation towers, purification towers, stripping towers (regeneration towers), so that distillation, purification, stripping, etc. can be performed.

EXAMPLES

Stainless steel plates (SUS304) of Sample No. 1 to Sample No. 11 described below were prepared, and, after degreasing washing with acetone and drying, the samples were used for the following measurement and evaluation under room temperature environment.

Sample No. 1: Finished material subjected to temper rolling (surface finish name: 2B)

Sample No. 2: Dull roll processed material (manufactured by Nippon Kinzoku Co., Ltd., standard name: PW)

Sample No. 3: Dull roll processed material (manufactured by Nippon Kinzoku Co., Ltd., standard name: PW7)

Sample No. 4: Shot blasted material (manufactured by TAIKA INDUSTRY Co., Ltd., lot No.: 55256-2)

Sample No. 5: Shot blasted material (manufactured by TAIKA INDUSTRY Co., Ltd., lot number: None)

Sample No. 6: Dull roll processed material (manufactured by Nippon Kinzoku Co., Ltd., standard name: PF15)

Sample No. 7: Shot blasted material (manufactured by TAIKA INDUSTRY Co., Ltd., lot No.: 55256-1)

Sample No. 8: Dull roll processed material (manufactured by NAS STAINLESS STEEL STRIP MFG. Co., Ltd., lot No.: 17500021)

Sample No. 9: Dull roll processed material (manufactured by NAS STAINLESS STEEL STRIP MFG. Co., Ltd., lot No.: 16K00407)

Sample No. 10: Dull roll processed material (manufactured by Nippon Kinzoku Co., Ltd., standard name: PF30)

Sample No. 11: Dull roll processed material (manufactured by Nippon Kinzoku Co., Ltd., standard name: PF70)

<Evaluation of Wettability>

The surface roughness of each sample was measured to determine the arithmetic mean roughness (Ra) and the mean width of roughness profile elements (Rsm). Furthermore, in order to evaluate the wettability of each sample, the contact angle of liquid on the surface (static contact angle, according to 9/2 method) was measured. The measurement was performed by using each of water, an ethylene glycol aqueous solution (concentration: 80% by mass), and an aliphatic amine mixed aqueous solution (concentration: 45% by mass) as the liquid. Measurement results are shown in Table 1.

TABLE 1

| Sample No. | Arithmetic mean roughness (Ra) [μm] | Mean width of roughness profile elements (Rsm) [mm] | Contact angle [degree] | | |
|---|---|---|---|---|---|
| | | | Water | Ethylene glycol aqueous solution | Amine aqueous solution |
| 1 | 0.069 | 0.055 | 78.05 | 54.62 | 38.30 |
| 2 | 0.124 | 0.059 | 75.50 | 56.00 | 37.40 |
| 3 | 0.191 | 0.090 | 63.55 | 46.64 | 33.08 |
| 4 | 0.338 | 0.029 | 36.54 | 20.15 | 13.96 |
| 5 | 0.558 | 0.041 | 37.22 | 24.08 | 16.31 |
| 6 | 0.720 | 0.094 | 34.70 | 23.66 | 15.39 |
| 7 | 0.739 | 0.044 | 36.02 | 15.07 | 13.26 |
| 8 | 0.801 | 0.147 | 53.75 | 37.90 | 25.31 |
| 9 | 0.963 | 0.135 | 55.90 | 46.27 | 21.71 |
| 10 | 1.447 | 0.205 | 66.55 | 46.17 | 38.62 |
| 11 | 3.892 | 0.279 | 71.02 | 52.90 | 29.66 |

When examining the relationship between the arithmetic mean roughness (Ra) and the contact angles from the measurement results of the steel plates of Sample No. 1 to Sample No. 11 shown in Table 1, a graph as shown in FIG. 1 was obtained. In FIG. 1, it is clear that the contact angles are remarkably reduced in the range where the arithmetic mean roughness (Ra) is 1.0 μm or less, and that the wettability in the range of the arithmetic mean roughness (Ra) being 0.3 to 1.0 μm is markedly improved. This tendency is seen in any of the three liquids. Therefore, it can be considered to be due to the physical surface shape.

When the relationship between the mean width of roughness profile elements (Rsm) and the contact angle was examined from the measurement results of the steel plates of Sample No. 1 to Sample No. 11, a graph as shown in FIG. 2 was obtained. In FIG. 2, the values of the mean width (Rsm) in the samples having a small contact angle (having high wettability) are in the range of approximately 0.02 to 0.10 mm, and the value does not exist in the range of more than 0.10 mm. However, even in the range of the value of the mean width (Rsm) being approximately 0.02 to 0.10 mm, a sample having a large contact angle is present.

When examining the relationship between the mean width of roughness profile elements (Rsm) and the contact angle for the steel plates of Sample No. 6 to Sample No. 8, a graph as shown in FIG. 3 was obtained. In FIG. 3, it is apparent that the contact angle decreases by the decrease of the mean width (Rsm). All of the steel plates of Sample No. 6 to Sample No. 8 have a value of the arithmetic mean roughness (Ra) being around 0.7 μm, which is in the range where the wettability has been clearly improved in FIG. 1. Therefore, it can be considered that, if the value of arithmetic mean roughness (Ra) is in the suitable range, good wettability is exhibited within the range where the mean width (Rsm) is approximately 0.10 mm or less.

The steel plates of Sample No. 1 to Sample No. 11 include those subjected to surface treatments by different processing, and hence the above measurement results do not appear to be affected by the type of processing. Therefore, it can be considered that the change in wettability is due to the state of surface roughness and shows a common property regardless of the type of processing.

<Wetting Test and Measurement of Wet Area>

With respect to each of the steel plates of the above-described Sample No. 1, Sample No. 6 and Sample No. 10, a test piece having a length of 70 mm and a width of 50 mm was prepared and installed vertically to perform the following wetting test.

A multi-point nozzle, having five nozzles (inner diameter: φ2 mm, outer diameter: φ4 mm) attached downward at 6 mm pitches, was prepared as a spray pipe, which was arranged above the test piece. A liquid was supplied from the multi-point nozzle to the upper end of the test piece to perform a wetting test on the test piece. At this time, an ethylene glycol aqueous solution (concentration: 80% by mass) was used as the liquid. The wetting test was conducted in each of a condition (condition C1) where the liquid was supplied at a constant flow rate to the test piece in the dry state, and a condition (condition C2) where the liquid was supplied in advance at a flow rate twice that of the condition C1 and it was then decreased to the flow rate of the condition C1.

Meanwhile, the wetted state by the liquid flowing down along the test piece was visually observed.

In addition, the liquid to be used was colored by a red dye (proxin, concentration: 0.02% by mass), and the above-described wetting test was performed with it in each of the condition C1 and the condition C2. In the meantime, the liquid film formed on the wet surface was photographed and a wet area was measured by image processing. Photographing was performed on both surfaces of the test piece, and the wet area was determined as an arithmetic mean value of the measured values on both sides. From the value of the obtained wet area, a ratio (%) of the wet area to the surface area in one surface of the test piece was calculated. The results are shown in Table 2. In the measurement of the wet area, waves and unevenness on the surface of the liquid film were not taken into consideration. Further, it has been confirmed by visual observation that there is no influence on the wettability by the dye.

TABLE 2

| Sample | Ratio of wet area to surface area [%] | |
| --- | --- | --- |
| No. | Condition C1 | Condition C2 |
| 1 | 38.6 | 33.4 |
| 6 | 71.2 | 86.1 |
| 10 | 40.2 | 43.4 |

As a result of observing the wet states of the test pieces, in Sample No. 1 and Sample No. 10, similar wet states were shown in both of the condition C1and the condition C2. Then, in the condition C1, the liquid flowing from each of the nozzles extended linearly downward and forming of five long and thin liquid films was observed. Also in the condition C2, long and thin liquid films were formed in the same manner except that merging was observed in a part of the liquid flowing linearly. On the other hand, in Sample No. 6, the liquid flowing from the nozzles wetted and spread in the lateral direction and combined to form one broad liquid film, in both the condition C1 and the condition C2. The difference between the observation results clearly appears as a numerical difference in the measurement results of the wet areas shown in Table 2, and it is apparent that the wettability of the steel plate of Sample No. 6 is markedly higher than that of the steel plates of Sample No. 1 and Sample No. 10. This is also in consistent with the measurement results of the contact angles shown in FIG. 1 to FIG. 3.

<Performance Evaluation as Packing>

A packing of a cylindrical shape (diameter: 60 mm, height: 210 mm) as illustrated in FIG. 4, in which a plurality of packing elements were arranged in parallel to each other, was produced by using each of steel sheets of Sample No. 1 (thickness: 0.50 mm) and Sample No. 6 (thickness: 0.15 mm) described above. In a gas-liquid contact apparatus having a structure as illustrated in FIG. 5, five sets of the obtained packing were loaded and arranged vertically to construct a gas-liquid contact section of five-stage structure, and the following absorption test was performed.

An aqueous solution of aliphatic amine mixture (concentration: 45% by mass) was prepared to be used as an absorption liquid. The temperature of the solution was adjusted to 25° C. and the solution was supplied from the spray pipe to the gas-liquid contact section at a constant flow rate. After passing through the gas-liquid contact section, the temperature of the absorption liquid at the bottom part was adjusted again and the solution was returned to the spray pipe, whereby the absorption liquid was circulated. In the meantime, a gas (temperature: 27° C.) having a carbon dioxide concentration of 5% by volume was supplied to the gas liquid contact section and was raised at a flow rate of 2 m/s. The carbon dioxide concentration of the gas discharged from the top of the gas-liquid contact apparatus was measured, and the absorption performance of the gas liquid contact section was evaluated as an absorption rate of carbon dioxide. When showing the evaluation result as a relative performance value obtained by defining an absorption performance of a packing produced by using a commercially available corrugated plate material as the standard (100), the absorption performance of Sample No. 6 was 180[–], whereas the absorption performance of Sample No. 1 was approximately 143[–]. From this, it can be considered that the gas-liquid contact efficiency of the steel plate of Sample No. 6 has been improved by approximately 25% compared to the steel plate of Sample No. 1 that has not been subjected to the roughening treatment.

It is possible to provide a hydrophilized material and a hydrophilized member in which satisfactory wettability imparted with roughening by physical treatment can be exhibited persistently, and, in the operation of a gas-liquid contact apparatus such as a gas separation apparatus, the necessity for maintenance and replacement of the apparatus and parts is reduced. Therefore, they contribute to generalization based on an improvement in economic performance in chemical treatments and manufacture processing, prevention of environmental pollution by the spread of treatments of exhaust gas, such as combustion gas, etc.

As there are many apparently widely different embodiments of the disclosure that may be made without departing from the spirit and scope thereof, it is to be understood that the disclosure is not limited to the specific embodiments thereof, except as defined in the appended claims.

What is claimed is:

1. A packing element made of a hydrophilized material, and configured to transfer mass or heat associated with gas-liquid contact,
   wherein the hydrophilized material has a surface provided with surface roughness in which arithmetic mean roughness is 0.3 µm or more and 1.0 µm or less and mean width of roughness profile elements is 0.1 mm or less.

2. The packing element according to claim 1, wherein in the surface, the arithmetic mean roughness is 0.3 to 0.8 µm and the mean width of roughness profile elements is 0.02 to 0.1 mm.

3. The packing element according to claim 1, wherein the hydrophilized material is composed of a metal or a plastic, wherein the metal includes a simple metal or an alloy, made of at least one metal element selected from iron, copper, nickel, titanium, zirconium, and aluminum, and the plastic includes at least one plastic selected from acrylic polymer, polyimide, polyolefin, epoxy resin, phenolic resin, polyvinyl chloride, and fluororesin.

4. The packing element according to claim 2, wherein the hydrophilized material is composed of a metal or a plastic, wherein the metal includes a simple metal or an alloy, made of at least one metal element selected from iron, copper, nickel, titanium, zirconium, and aluminum, and the plastic includes at least one plastic selected from acrylic polymer, polyimide, polyolefin, epoxy resin, phenolic resin, polyvinyl chloride, and fluororesin.

5. A nozzle configured to contact a liquid, and at least partially made of a hydrophilized material,
   wherein the hydrophilized material has a surface provided with surface roughness in which arithmetic mean roughness is 0.3 µm or more and 1.0 µm or less and mean width of roughness profile elements is 0.1 mm or less.

6. The nozzle according to claim 5, wherein in the surface of the hydrophilized material, the arithmetic mean roughness is 0.3 to 0.8 µm and the mean width of roughness profile elements is 0.02 to 0.1 mm.

7. The nozzle according to claim 5, wherein the hydrophilized material is composed of a metal or a plastic, wherein the metal includes a simple metal or an alloy, made of at least one metal element selected from iron, copper, nickel, titanium, zirconium, and aluminum, and the plastic includes at least one plastic selected from acrylic polymer, polyimide, polyolefin, epoxy resin, phenolic resin, polyvinyl chloride, and fluororesin.

8. The nozzle according to claim 5, further comprising a discharge port for discharging the liquid, wherein the discharge port has a surface provided with the surface roughness.

9. A gas-liquid contact apparatus comprising:
a gas-liquid contact section that has a plurality of packing elements made of the hydrophilized material having a surface provided with surface roughness in which arithmetic mean roughness is 0.3 µm or more and 1.0 µm or less and mean width of roughness profile elements is 0.1 mm or less;
a liquid supply system that supplies a liquid to the gas-liquid contact section and causes the liquid to flow down along surfaces of the plurality of packing elements; and
a gas supply system that supplies a gas to the gas-liquid contact section so as to contact the liquid flowing down along the surfaces of the plurality of packing elements.

10. The gas-liquid contact apparatus according to claim 9, wherein, in the surface of the hydrophilized material, the arithmetic mean roughness is 0.3 to 0.8 µm and the mean width of roughness profile elements is 0.02 to 0.1 mm.

11. The gas-liquid contact apparatus according to claim 9, wherein the hydrophilized material is composed of a metal or a plastic, wherein the metal includes a simple metal or an alloy, made of at least one metal element selected from iron, copper, nickel, titanium, zirconium, and aluminum, and the plastic includes at least one plastic selected from acrylic polymer, polyimide, polyolefin, epoxy resin, phenolic resin, polyvinyl chloride, and fluororesin.

12. The gas-liquid contact apparatus according to claim 9, wherein the liquid supply system supplies, as the liquid, an absorption liquid that can absorb a component contained in the gas, so as to be configured as a gas separation apparatus that the component contained in the gas is transferred to the absorption liquid through gas-liquid contact in the gas-liquid contact section.

13. The gas-liquid contact apparatus according to claim 9, wherein the absorption liquid is an aqueous liquid containing an amine compound, and the component of the gas to be transferred to the absorption liquid is carbon dioxide.

14. The gas-liquid contact apparatus according to claim 9, wherein the plurality of packing elements have a flat plate shape and are arranged upright in parallel to each other.

* * * * *